US011106206B2

(12) United States Patent
Watanabe et al.

(10) Patent No.: US 11,106,206 B2
(45) Date of Patent: Aug. 31, 2021

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Nobuyuki Watanabe, Wako (JP); Makoto Nakatsuka, Wako (JP); Seiichi Yamamoto, Tokyo (JP); Yuki Motegi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 255 days.

(21) Appl. No.: 16/286,642

(22) Filed: Feb. 27, 2019

(65) Prior Publication Data

US 2019/0271982 A1 Sep. 5, 2019

(30) Foreign Application Priority Data

Mar. 1, 2018 (JP) .............................. JP2018-036854

(51) Int. Cl.
*G05D 1/00* (2006.01)
*G05D 1/02* (2020.01)
*B60W 30/182* (2020.01)

(52) U.S. Cl.
CPC ......... *G05D 1/0088* (2013.01); *G05D 1/0212* (2013.01); *B60W 30/182* (2013.01); *B60W 2554/00* (2020.02); *G05D 2201/0213* (2013.01)

(58) Field of Classification Search
CPC ............... G05D 1/0088; G05D 1/0212; G05D 2201/0213; B60W 2554/00; B60W 30/182; B60W 30/18; B60W 30/09; B60W 40/04; B60W 40/08
See application file for complete search history.

(56) References Cited

U.S. PATENT DOCUMENTS

| 5,659,779 | A | * | 8/1997 | Laird | ...................... B61L 27/04 700/245 |
| 10,053,088 | B1 | * | 8/2018 | Askeland | ............... B60N 2/002 |
| 10,672,389 | B1 | * | 6/2020 | Abeloe | .................. G10L 13/027 |
| 2018/0050664 | A1 | * | 2/2018 | Tarte | ....................... B60R 25/31 |
| 2018/0074507 | A1 | * | 3/2018 | Gao | ..................... G05D 1/0088 |
| 2018/0173240 | A1 | * | 6/2018 | Fang | .................. B60W 50/0097 |

(Continued)

FOREIGN PATENT DOCUMENTS

JP 2017-061287 3/2017

*Primary Examiner* — Donald J Wallace
(74) *Attorney, Agent, or Firm* — Amin, Turocy & Watson, LLP

(57) ABSTRACT

A vehicle control device includes a recognizer (130) that recognizes a situation near an own-vehicle, and a driving controller (140, 160) that controls one or both of steering or acceleration/deceleration of the own-vehicle on the basis of a recognition result of the recognizer, wherein the driving controller does not perform determination of an operation mode of control of the acceleration/deceleration when the recognizer has recognized that an occupant is riding in the own-vehicle, and determines the operation mode of control of the acceleration/deceleration on the basis of a state of another vehicle present near the own-vehicle recognized by the recognizer when the recognizer has recognized that no occupant is riding in the own-vehicle.

16 Claims, 12 Drawing Sheets

(56) References Cited

U.S. PATENT DOCUMENTS

| | | | |
|---|---|---|---|
| 2019/0088135 A1* | 3/2019 | Do | G08G 1/015 |
| 2019/0113357 A1* | 4/2019 | Watanabe | G01C 21/3605 |
| 2019/0188493 A1* | 6/2019 | Tiziani | B60W 50/0098 |

* cited by examiner

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2018-036854, filed Mar. 1, 2018, the content of which is incorporated herein by reference.

BACKGROUND OF THE INVENTION

Field of the Invention

The present invention relates to a vehicle control device, a vehicle control method, and a storage medium.

Description of Related Art

In recent years, research has been conducted on automatic control of the driving of a vehicle (hereinafter referred to as automated driving). In relation to this, a technology for improving fuel economy by performing coasting when no occupant is riding in a vehicle that is being automatically driven is known (for example, see Japanese Unexamined Patent Application, First Publication No. 2017-061287).

SUMMARY OF THE INVENTION

Here, when no occupant is riding in a vehicle that is being automatically driven, it is sometimes possible to shorten the travel time by suddenly accelerating or decelerating rather than traveling with consideration to the ride comfort of occupants. However, in the technology of the related art, the vehicle cannot suddenly accelerate or decelerate although it can perform coasting according to the presence or absence of an occupant in the vehicle.

The present invention has been made in view of such circumstances and it is an object of the present invention to provide a vehicle control device, a vehicle control method, and a storage medium with which it is possible to suddenly accelerate or decelerate according to the presence or absence of an occupant in the vehicle and thus to shorten the travel time.

A vehicle control device, a vehicle control method, and a storage medium according to the present invention adopt the following configurations.

(1) A vehicle control device according to an aspect of the present invention includes a recognizer configured to recognize a situation near an own-vehicle, and a driving controller configured to control one or both of steering or acceleration/deceleration of the own-vehicle on the basis of a recognition result of the recognizer, wherein the driving controller is configured to not perform determination of an operation mode of control of the acceleration/deceleration when the recognizer has recognized that an occupant is riding in the own-vehicle and to determine the operation mode of control of the acceleration/deceleration on the basis of a state of another vehicle present near the own-vehicle recognized by the recognizer when the recognizer has recognized that no occupant is riding in the own-vehicle.

(2) In the above aspect (1), the driving controller is configured to perform the determination of the operation mode of control of the acceleration/deceleration on the basis of a state of another vehicle present near the own-vehicle when the recognizer has recognized that no occupant is riding in the own-vehicle.

(3) In the above aspect (1) or (2), the driving controller is configured to set the operation mode to an operation mode in which limitation of the acceleration/deceleration is relaxed when the recognizer has recognized that the other vehicle is an automatically driven vehicle, compared to when the recognizer has recognized that the other vehicle is not an automatically driven vehicle.

(4) In the above aspects (1) to (3), the driving controller is configured to, if the recognizer recognizes that the other vehicle is an automatically driven vehicle, determine the operation mode on the basis of whether or not the recognizer has recognized that an occupant is riding in the other vehicle.

(5) In the above aspect (4), the driving controller is configured to, if the recognizer recognizes that the other vehicle is an automatically driven vehicle, set the operation mode to an operation mode in which limitation of the acceleration/deceleration is relaxed when the recognizer has recognized that no occupant is riding in the other vehicle, compared to when the recognizer has recognized that an occupant is riding in the other vehicle.

(6) In the above aspects (1) to (5), the driving controller is configured to set the operation mode to an operation mode in which limitation of the acceleration/deceleration is the most relaxed when the recognizer has recognized that no other vehicle is present near the own-vehicle.

(7) In the above aspects (1) to (6), the vehicle control device further includes a travel plan generator configured to generate a travel plan for preferentially traveling on a route in which traveling is possible in an operation mode in which limitation of the acceleration/deceleration is relaxed, wherein the driving controller is configured to control the own-vehicle on the basis of the travel plan generated by the travel plan generator.

(8) In the above aspect (7), the travel plan generator is configured to preferentially select a route with a small number of other vehicles.

(9) In the above aspect (7) or (8), the travel plan generator is configured to preferentially select a route with a low right or left turn frequency.

(10) In the above aspects (1) to (9), the recognizer is configured to limit recognition processing when the driving controller performs control in an operation mode in which limitation of the acceleration/deceleration is relaxed, compared to when the driving controller does not perform control in the operation mode in which limitation of the acceleration/deceleration is relaxed.

(11) A vehicle control device includes a recognizer configured to recognize a situation near an own-vehicle, and a driving controller configured to control one or both of steering or acceleration/deceleration of the own-vehicle on the basis of a recognition result of the recognizer, wherein the recognizer is configured to limit recognition processing when the driving controller controls the acceleration/deceleration in an operation mode in which limitation of the acceleration/deceleration is relaxed compared to when the driving controller does not control the acceleration/deceleration in the operation mode in which limitation of the acceleration/deceleration is relaxed.

(12) A vehicle control method includes a vehicle control device recognizing a situation near an own-vehicle, and controlling one or both of steering or acceleration/deceleration of the own-vehicle on the basis of a result of the recognition, and determining an operation mode of control of the acceleration/deceleration on the basis of a recognized state of another vehicle present near the own-vehicle.

(13) A storage medium causes a vehicle control device to recognize a situation near an own-vehicle, to control one or both of steering or acceleration/deceleration of the own-vehicle on the basis of a result of the recognition, and to determine an operation mode of control of the acceleration/deceleration on the basis of a recognized state of another vehicle present near the own-vehicle.

According to the above aspects (1) to (13), it is possible to suddenly accelerate or decelerate according to the presence or absence of an occupant in the vehicle and thus to shorten the travel time.

According to the configuration of aspect (2), it is possible to shorten the travel time when there is no occupant in the vehicle.

According to the configuration of aspect (3), it is possible to limit contact with other nearby vehicles that are being manually driven.

According to the configuration of aspect (4), it is possible to shorten the travel time while considering other nearby vehicles.

According to the configuration of aspect (5), it is possible to shorten the travel time while considering occupants of other nearby vehicles.

According to the configuration of aspect (6), it is possible to shorten the travel time when there is no occupant in another nearby vehicle.

According to the configuration of aspect (7), it is possible to shorten the travel time when no other nearby vehicle is present.

According to the constitutions of aspects (8) to (10), it is possible to further shorten the travel time.

According to the configurations of aspects (11) and (12), it is possible to limit power consumption of the own-vehicle while shortening the travel time.

DETAILED DESCRIPTION OF THE INVENTION

Hereinafter, embodiments of a vehicle control device, a vehicle control method, and a storage medium of the present invention will be described with reference to the drawings.

Embodiments

[Overall Configuration]

Figure 1:
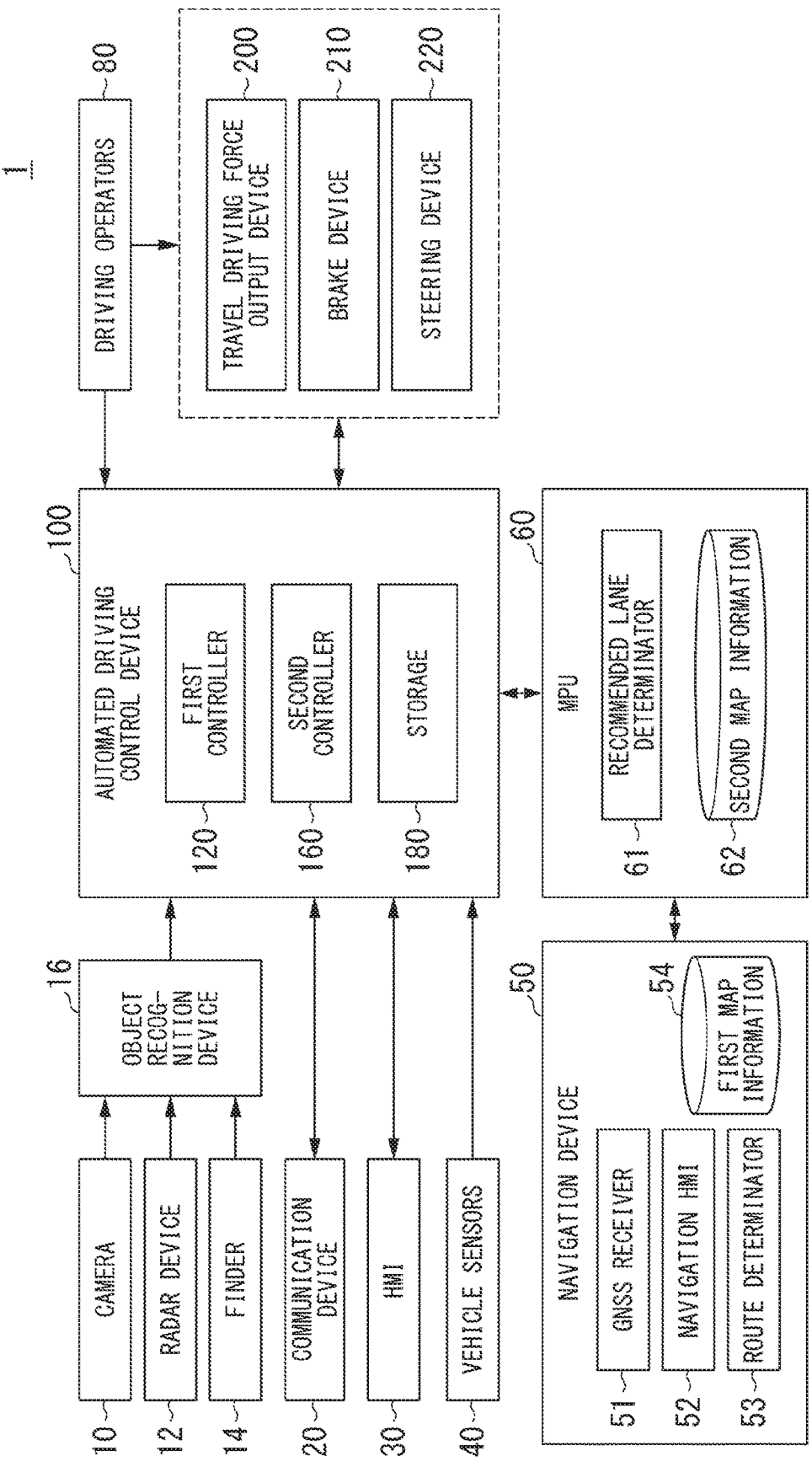
FIG. 1 is a configuration diagram of a vehicle system using a vehicle control device according to an embodiment.

FIG. 1 is a configuration diagram of a vehicle system 1 using a vehicle control device according to a first embodiment. A vehicle in which the vehicle system 1 is mounted (hereinafter referred to as an own-vehicle M) is, for example, a vehicle such as a two-wheeled vehicle, a three-wheeled vehicle, or a four-wheeled vehicle, and a driving source thereof includes an internal combustion engine such as a diesel engine or a gasoline engine, an electric motor, or a combination thereof. The electric motor operates using electric power generated by a generator connected to the internal combustion engine or using discharge power of a secondary battery or a fuel cell. In the present embodiment, the own-vehicle M is a vehicle that is being automatically driven. The vehicle system 1 includes, for example, a camera 10, a radar device 12, a finder 14, an object recognition device 16, a communication device 20, a human machine interface (HMI) 30, vehicle sensors 40, a navigation device 50, a map positioning unit (MPU) 60, driving operators 80, an automated driving control device 100, a travel driving force output device 200, a brake device 210, and a steering device 220. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added.

The camera 10 is, for example, a digital camera using a solid-state imaging device such as a charge coupled device (CCD) or complementary metal oxide semiconductor (CMOS) image sensor. The camera 10 is attached to the own-vehicle M at an arbitrary location. For imaging the area in front of the vehicle, the camera 10 is attached to an upper portion of a front windshield, a rear surface of a rearview mirror, or the like. For example, the camera 10 repeats imaging of the surroundings of the own-vehicle M at regular intervals. The camera 10 may also be a stereo camera.

The radar device 12 radiates radio waves such as millimeter waves around the own-vehicle M and detects radio waves reflected by an object (reflected waves) to detect at least the position (distance and orientation) of the object. The radar device 12 is attached to the own-vehicle M at an arbitrary location. The radar device 12 may detect the position and velocity of an object using a frequency modulated continuous wave (FM-CW) method.

The finder 14 is a light detection and ranging (LIDAR) finder. The finder 14 illuminates the surroundings of the own-vehicle M with light and measures scattered light. The finder 14 detects the distance to a target on the basis of a period of time from when light is emitted to when light is received. The light radiated is, for example, pulsed laser light. The finder 14 is attached to the own-vehicle M at an arbitrary location.

The object recognition device 16 performs a sensor fusion process on results of detection by some or all of the camera 10, the radar device 12, and the finder 14 to recognize the position, type, speed, or the like of the object. The object recognition device 16 outputs the recognition result to the automated driving control device 100. The object recognition device 16 may output detection results of the camera 10, the radar device 12 and the finder 14 to the automated driving control device 100 as they are. The object recognition device 16 may be omitted from the vehicle system 1.

For example, the communication device 20 communicates with other vehicles near the own-vehicle M using a cellular network, a Wi-Fi network, Bluetooth (registered trademark), dedicated short range communication (DSRC) or the like or communicates with various server devices via wireless base stations.

The HMI 30 presents various types of information to an occupant in the own-vehicle M and receives an input operation from the occupant. The HMI 30 includes various display devices, a speaker, a buzzer, a touch panel, switches, keys, or the like.

The vehicle sensors 40 include a vehicle speed sensor that detects the speed of the own-vehicle M, an acceleration sensor that detects the acceleration thereof, a yaw rate sensor that detects an angular speed thereof about the vertical axis, an orientation sensor that detects the orientation of the own-vehicle M, or the like.

The navigation device 50 includes, for example, a global navigation satellite system (GNSS) receiver 51, a navigation HMI 52, and a route determinator 53. The navigation device 50 holds first map information 54 in a storage device such as a hard disk drive (HDD) or a flash memory.

The GNSS receiver 51 specifies the position of the own-vehicle M on the basis of signals received from GNSS satellites. The position of the own-vehicle M may also be specified or supplemented by an inertial navigation system (INS) using the output of the vehicle sensors 40.

The navigation HMI 52 includes a display device, a speaker, a touch panel, a key, or the like. The navigation HMI 52 may be partly or wholly shared with the HMI 30 described above.

For example, the route determinator 53 determines a route from the position of the own-vehicle M specified by the GNSS receiver 51 (or an arbitrary input position) to a destination input by the occupant (hereinafter referred to as an on-map route) using the navigation HMI 52 by referring to the first map information 54. The first map information 54 is, for example, information representing shapes of roads by links indicating roads and nodes connected by the links. The first map information 54 may include curvatures of roads, point of interest (POI) information, or the like. The on-map route is output to the MPU 60.

The navigation device 50 may also perform route guidance using the navigation HMI 52 on the basis of the on-map route. The navigation device 50 may be realized, for example, by a function of a terminal device such as a smartphone or a tablet possessed by the occupant. The navigation device 50 may also transmit the current position and the destination to a navigation server via the communication device 20 and acquire a route equivalent to the on-map route from the navigation server.

The MPU 60 includes, for example, a recommended lane determinator 61 and holds second map information 62 in a storage device such as an HDD or a flash memory. The recommended lane determinator 61 divides the on-map route provided from the navigation device 50 into a plurality of blocks (for example, into blocks each 100 meters long in the direction in which the vehicle travels) and determines a recommended lane for each block by referring to the second map information 62. The recommended lane determinator 61 determines the recommended lane such that it is given a position in a lane order counted from the leftmost lane. When there is a branch point on the on-map route, the recommended lane determinator 61 determines a recommended lane such that the own-vehicle M can travel on a reasonable route for proceeding to the branch destination.

The second map information 62 is map information with higher accuracy than the first map information 54. The second map information 62 includes, for example, information of the centers of lanes, information of the boundaries of lanes, or information of the types of lanes. The second map information 62 may also include road information, traffic regulation information, address information (addresses/postal codes), facility information, telephone number information, or the like. The second map information 62 may be updated as needed by the communication device 20 communicating with another device.

The driving operators 80 include, for example, an accelerator pedal, a brake pedal, a shift lever, a steering wheel, a different shaped steering member, a joystick, and other operators. Sensors for detecting the amounts of operation or the presence or absence of operation are attached to the driving operators 80. Results of the detection are output to the automated driving control device 100 or some or all of the travel driving force output device 200, the brake device 210, and the steering device 220.

The automated driving control device 100 includes, for example, a first controller 120, a second controller 160, and a storage 180. Each of the first controller 120 and the second controller 160 is realized, for example, by a processor such as a central processing unit (CPU) executing a storage medium (software). Some or all of these components may be realized by hardware (including circuitry) such as large scale integration (LSI), an application specific integrated circuit (ASIC), a field-programmable gate array (FPGA), or a graphics processing unit (GPU) or may be realized by hardware and software in cooperation. The program may be stored in a storage device such as a hard disk drive (HDD) or a flash memory or the storage 180 in the automated driving control device 100 in advance or may be stored in a detachable storage medium such as a DVD or a CD-ROM and then installed in the storage 180 by inserting the storage medium into a drive device.

The storage 180 is realized by a non-transitory storage medium such as an HDD, a flash memory, an electrically erasable programmable read only memory (EEPROM), or a read only memory (ROM). The storage 180 stores, for example, a program that is read and executed by a hardware processor.

Figures 2, 3:
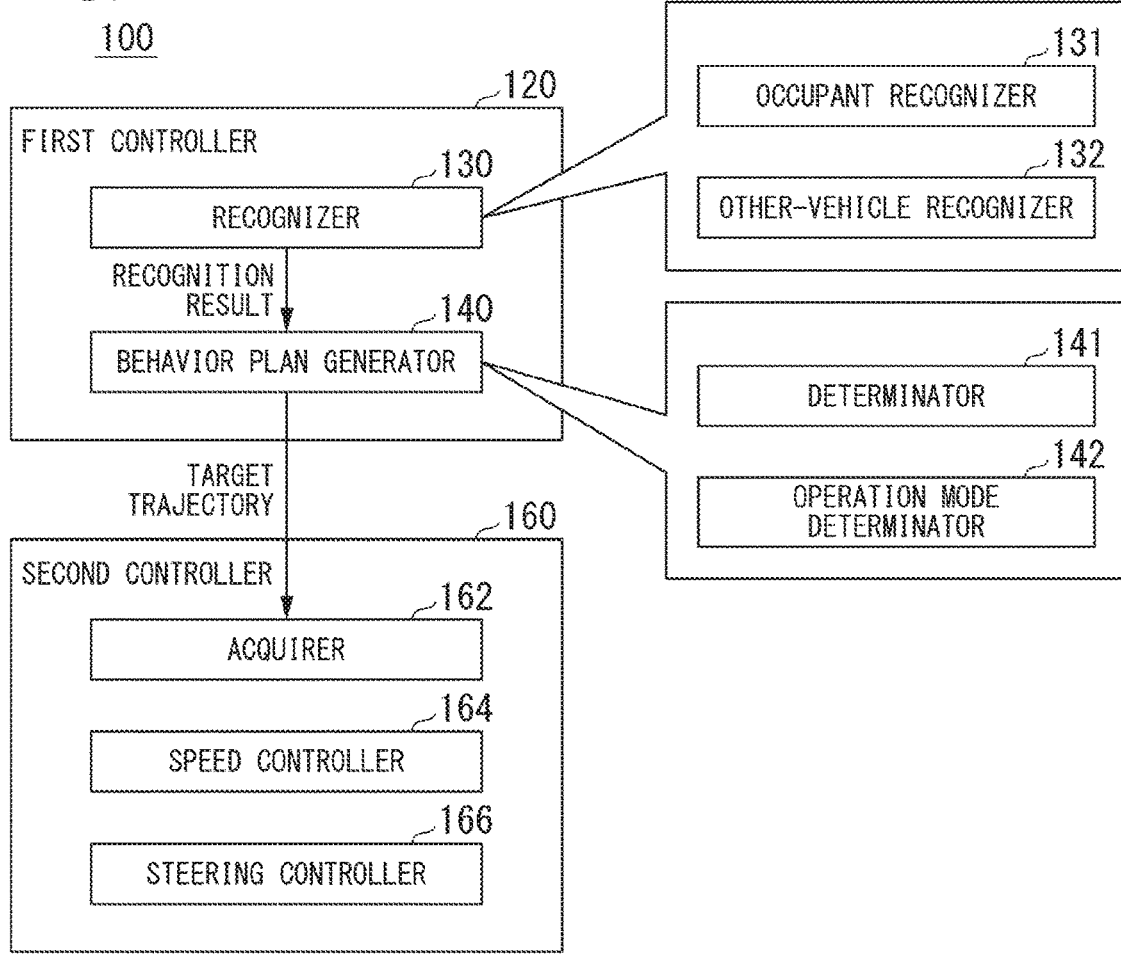
FIG. 2 is a functional configuration diagram of a first controller and a second controller.
FIG. 3 is a table showing an example of the correspondence between the operation modes of acceleration/deceleration control and the limit values of acceleration/deceleration control according to an embodiment.

FIG. 2 is a functional configuration diagram of the first controller 120 and the second controller 160. The first controller 120 includes, for example, a recognizer 130 and a behavior plan generator 140. The recognizer 130 includes, for example, an occupant recognizer 131 and an other-vehicle recognizer 132. The behavior plan generator 140 includes, for example, a determinator 141 and an operation mode determinator 142. For example, the first controller 120 realizes a function based on artificial intelligence (AI) and a function based on a previously given model in parallel. For example, the function of "recognizing an intersection" is realized by performing recognition of an intersection through deep learning or the like and recognition based on previously given conditions (presence of a signal, a road sign, or the like for which pattern matching is possible) in parallel and evaluating both comprehensively through scoring. This guarantees the reliability of automated driving.

The recognizer 130 recognizes situations near the own-vehicle M on the basis of information input from the camera 10, the radar device 12, and the finder 14 via the object recognition device 16. Specifically, the recognizer 130 recognizes states of an object near the own-vehicle M such as the position, speed and acceleration thereof. The position of the object is recognized, for example, as a position in an absolute coordinate system whose origin is at a representative point on the own-vehicle M (such as the center of gravity or the center of a drive shaft thereof), and used for control. The position of the object may be represented by a representative point on the object such as the center of gravity or a corner thereof or may be represented by an expressed region. The "states" of the object may include an acceleration or jerk of the object or a "behavior state" thereof (for example, whether or not the object is changing or is going to change lanes).

The recognizer 130 recognizes, for example, a (traveling) lane in which the own-vehicle M is traveling. For example, the recognizer 130 recognizes the traveling lane, for example, by comparing a pattern of road lane lines (for example, an arrangement of solid and broken lines) obtained from the second map information 62 with a pattern of road lane lines near the own-vehicle M recognized from an image captured by the camera 10. The recognizer 130 may recognize the traveling lane by recognizing travel boundaries (road boundaries) including road lane lines, road shoulders, curbs, a median strip, guard rails, or the like, without being limited to road lane lines. This recognition may be performed taking into consideration a position of the own-vehicle M acquired from the navigation device 50 or a result of processing by the INS. The recognizer 130 recognizes temporary stop lines, obstacles, red lights, toll gates, and other road phenomena.

When recognizing the traveling lane, the recognizer 130 recognizes the position or attitude of the own-vehicle M with respect to the traveling lane. For example, the recognizer 130 may recognize both a deviation from the lane center of the reference point of the own-vehicle M and an angle formed by the travel direction of the own-vehicle M relative to an extension line of the lane center as the relative position and attitude of the own-vehicle M with respect to the traveling lane. Alternatively, the recognizer 130 may recognize the position of the reference point of the own-vehicle M with respect to one of the sides of the traveling lane (a road lane line or a road boundary) or the like as the relative position of the own-vehicle M with respect to the traveling lane.

In the above recognition process, the recognizer 130 may derive the accuracy of recognition and output it as recognition accuracy information to the behavior plan generator 140. For example, the recognizer 130 generates recognition accuracy information on the basis of the frequency of recognition of road lane lines in a certain period. The functions of the occupant recognizer 131 and the other-vehicle recognizer 132 of the recognizer 130 will be described later.

The behavior plan generator 140 generates a target trajectory along which the own-vehicle M will travel in the future, basically such that the own-vehicle M travels in the recommended lane determined by the recommended lane determinator 61 while automated driving is performed to cope with situations occurring near the own-vehicle M. The target trajectory includes, for example, a speed element. The target trajectory is expressed, for example, by an arrangement of points (trajectory points) which are to be reached by the own-vehicle M in order. The trajectory points are points to be reached by the own-vehicle M at intervals of a predetermined travel distance (for example, at intervals of about several meters) along the road. Apart from this, a target speed and a target acceleration for each predetermined sampling time (for example, every several tenths of a second) are determined as a part of the target trajectory. The functions of the determinator 141 and the operation mode determinator 142 of the behavior plan generator 140 will be described later.

The second controller 160 includes, for example, an acquirer 162, a speed controller 164, and a steering controller 166. The acquirer 162 acquires information on the target trajectory generated by the behavior plan generator 140 and stores it in a memory (not shown). The speed controller 164 controls the travel driving force output device 200 or the brake device 210 on the basis of the speed element included in the target trajectory stored in the memory. The steering controller 166 controls the steering device 220 according to the degree of curvature of the target trajectory stored in the memory. The processing of the speed controller 164 and the steering controller 166 is realized, for example, by a combination of feedforward control and feedback control. As one example, the steering controller 166 performs the processing by combining feedforward control according to the curvature of the road ahead of the own-vehicle M and feedback control based on deviation from the target trajectory. The behavior plan generator 140 and the second controller 160 are examples of the "driving controller."

The travel driving force output device 200 outputs a travel driving force (torque) required for the vehicle to travel to driving wheels. The travel driving force output device 200 includes, for example, a combination of an internal combustion engine, an electric motor, a transmission, and the like and an ECU that controls them. The ECU controls the above constituent elements according to information input from the second controller 160 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the second controller 160 or information input from the driving operators 80 such that a brake torque corresponding to a braking operation is output to each wheel. The brake device 210 may include, as a backup, a mechanism for transferring a hydraulic pressure generated by an operation of the brake pedal included in the driving operators 80 to the cylinder via a master cylinder. The brake device 210 is not limited to that configured as described above and may be an electronically controlled hydraulic brake device that controls an actuator according to information input from the second controller 160 and transmits the hydraulic pressure of the master cylinder to the cylinder.

The steering device 220 includes, for example, a steering ECU and an electric motor. The electric motor, for example, applies a force to a rack-and-pinion mechanism to change the direction of steering wheels. The steering ECU drives the electric motor according to information input from the second controller 160 or information input from the driving operators 80 to change the direction of the steering wheels.

[About Limitation of Acceleration/Deceleration Control]

The limitation of acceleration/deceleration control will be described below. FIG. 3 is a table showing an example of the correspondence between the operation modes of acceleration/deceleration control and the limit values of acceleration/deceleration control according to an embodiment. The operation mode determinator 142 of the present embodiment sets the acceleration/deceleration limitation of the own-vehicle M to one of the operation modes (1) to (5). In the following description, an acceleration having a positive value indicates acceleration and an acceleration having a negative value indicates deceleration. In the operation mode (1), the upper limit value of acceleration is, for example, 0.2 [G] and the lower limit value of acceleration is, for example, −0.2 [G]. In the operation mode (2), the upper limit value of acceleration is, for example, 0.3 [G] and the lower limit value of acceleration is, for example, −0.25 [G]. In the operation mode (3), the upper limit value of acceleration is, for example, 0.25 [G] and the lower limit value of acceleration is, for example, 0.25 [G]. In the operation mode (4), the upper limit value of acceleration is, for example, 0.25 [G] and the lower limit value of acceleration is, for example, −0.3 [G]. In the operation mode (5), the upper limit value of acceleration is, for example, 0.4 [G] and the lower limit value of acceleration is, for example, −0.4 [G].

Therefore, the upper limit of acceleration is the most relaxed in the operation mode (5) and becomes stricter gradually in the order of the operation mode (2), the operation modes (3) and (4), and the operation mode (1). The upper limit of deceleration is the most relaxed in the operation mode (5) and becomes stricter gradually in the order of the operation mode (4), the operation modes (2) and (3), and the operation mode (1). The upper and lower limit values of acceleration/deceleration in each operation mode are merely examples and the present invention is not limited thereto.

The operation mode determinator 142 determines that the acceleration/deceleration limitation of the own-vehicle M is in one of the operation modes (1) to (5) on the basis of detection and determination results of the functional units. Details of the functional units will be described below. The occupant recognizer 131 detects the presence or absence of an occupant in the own-vehicle M. The occupant recognizer 131 recognizes that an occupant is riding in the own-vehicle M or that no occupant is riding in the own-vehicle M, for example, on the basis of detection results of seat occupancy sensors of seats, a detection result of a grip sensor of the steering wheel, or a captured image of the interior of the own-vehicle M.

The other-vehicle recognizer 132 recognizes whether or not another vehicle is present near the own-vehicle M. For example, the other-vehicle recognizer 132 recognizes that another vehicle is present near the own-vehicle M or that no other vehicle is present near the own-vehicle M, for example, on the basis of an image of the surroundings of the own-vehicle M captured by the camera 10, a detection result of the radar device 12, or a detection result of the finder 14.

The other-vehicle recognizer 132 recognizes that an occupant is riding in another vehicle present near the own-vehicle M or that no occupant is riding therein. The other-vehicle recognizer 132 recognizes that an occupant is riding in another vehicle, for example, on the basis of the other vehicle indicated by the image captured by the camera 10 and the presence or absence of an occupant in the other vehicle. The other-vehicle recognizer 132 may also receive information indicating that an occupant is riding in the other vehicle from the other vehicle through inter-vehicle communication and recognize that an occupant is riding in the other vehicle or that no occupant is riding therein.

The other-vehicle recognizer 132 recognizes whether or not the other vehicle present near the own-vehicle M is a vehicle that is being automatically driven. The other-vehicle recognizer 132 recognizes that the other vehicle is a vehicle that is being automatically driven or that it is a vehicle that is being manually driven, for example, by recognizing an explicit object explicitly indicating that the other vehicle is a vehicle that is being automatically driven (for example, an explicit lamp or a display device indicating that it is being automatically driven). The other-vehicle recognizer 132 may also receive information indicating that the other vehicle is a vehicle that is being automatically driven from the other vehicle through inter-vehicle communication and recognize that the other vehicle is a vehicle that is being automatically driven or that it is being manually driven.

The determinator 141 determines whether or not an occupant is riding in the own-vehicle M on the basis of the recognition result of the occupant recognizer 131. The determinator 141 determines whether or not another vehicle is present near the own-vehicle M on the basis of the recognition result of the other-vehicle recognizer 132. The determinator 141 determines whether or not an occupant is riding in the other vehicle on the basis of the recognition result of the other-vehicle recognizer 132. The determinator 141 determines whether or not the other vehicle is a vehicle that is being automatically driven on the basis of the recognition result of the other-vehicle recognizer 132.

On the basis of the determination results of the determinator 141, the operation mode determinator 142 determines which of the operation modes (1) to (5) the acceleration/deceleration limitation of the own-vehicle M is set to.

[Situation in which Operation Mode (5) is Determined]

Figure 4:
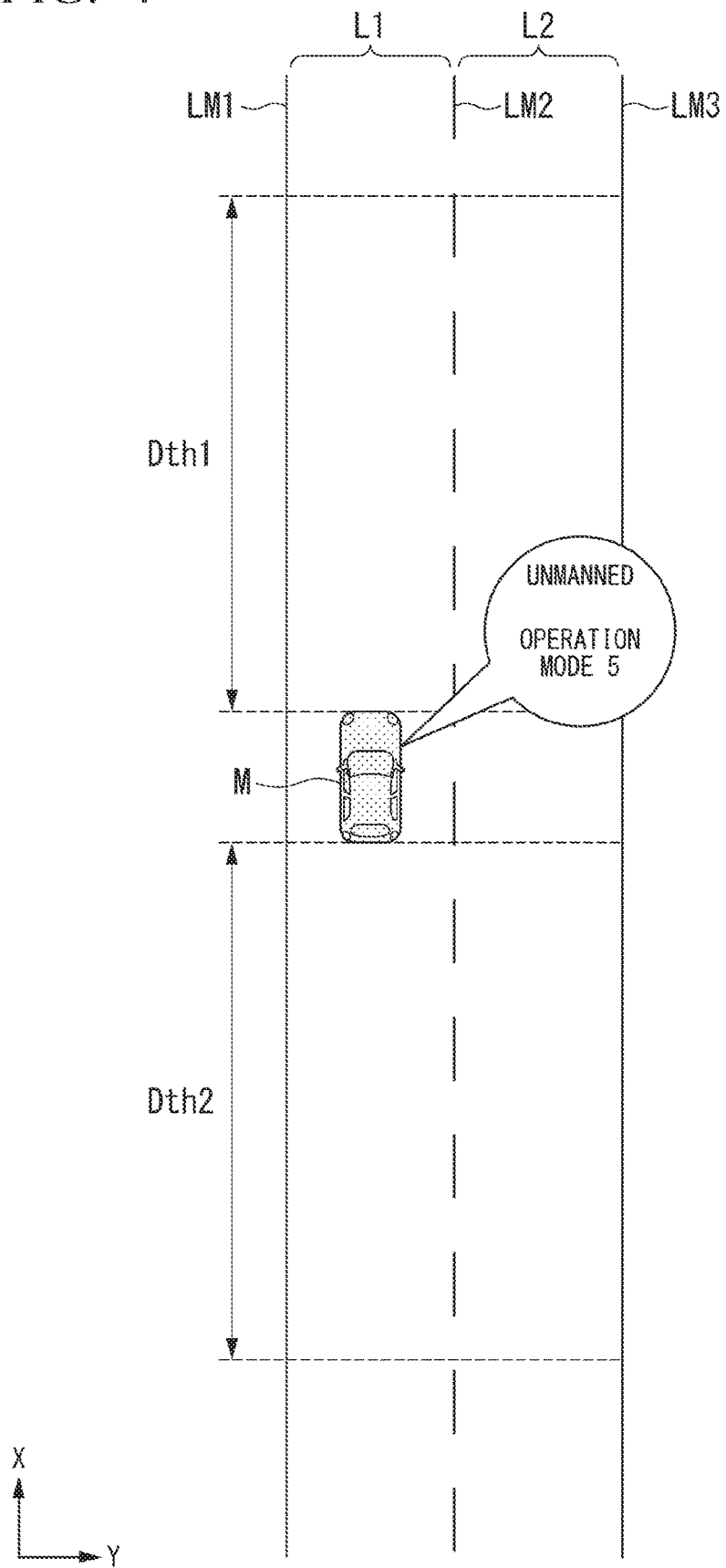
FIG. 4 is a diagram showing an exemplary situation in which it is determined that the acceleration/deceleration limitation of an own-vehicle is in an operation mode (5).

FIG. 4 is a diagram showing an exemplary situation in which it is determined that the acceleration/deceleration limitation of the own-vehicle M is in the operation mode (5). In the figure, M represents the own-vehicle M. L1 represents the own lane and L2 represents a lane adjacent to the own lane L1. LM1 represents a lane line on the left side with respect to the moving direction of the own-vehicle M out of two lane lines defining the own lane L1 and LM2 represents a lane line on the right side with respect to the moving direction of the own-vehicle M out of the two lane lines defining the own lane L1. LM3 represents a lane line on the right side with respect to the traveling direction of the adjacent lane L2 out of two lane lines defining the adjacent lane L2. The X direction is the moving direction of the own-vehicle M and the Y direction is the width direction of the own lane L1.

In the example shown in FIG. 4, the own-vehicle M is a vehicle that is being driven by automated driving and is also an unmanned vehicle in which no occupant is riding. The determinator 141 determines that no occupant is riding in the own-vehicle M, for example, on the basis of the recognition result of the occupant recognizer 131. In the example shown in FIG. 4, no other vehicle is present near the own-vehicle M. For example, the determinator 141 determines that no other vehicle is present near the own-vehicle M when the recognition result of the other-vehicle recognizer 132 indicates that no other vehicle is present at or within a distance indicated by a predetermined threshold value (a threshold value Dth1 shown in the figure) from the position of the own-vehicle M in the moving direction and no other vehicle is present at or within a distance indicated by a predetermined threshold value (a threshold value Dth2 shown in the figure) from the position of the own-vehicle M in the direction opposite to the moving direction.

The threshold value Dth1 is a value indicating a distance defined such that, even if another vehicle performs sudden deceleration, sudden stopping, or the like in a range outside the range from the position of the own-vehicle M to a position that is away from the position of the own-vehicle M by the distance (the threshold value Dth1), the own-vehicle M can suddenly decelerate or suddenly stop without coming into contact with the other vehicle and is, for example, a value indicating several tens to several hundreds of meters. The threshold value Dth2 is a value indicating a distance defined such that, even if the own-vehicle M performs sudden deceleration, sudden stopping, or the like in a range outside the range from the position of the own-vehicle M to a position that is away from the position of the own-vehicle M by the distance (the threshold value Dth2), the other vehicle can stop without coming into contact with the own-vehicle M and is, for example, a value indicating several tens to several hundreds of meters.

The situation in which the determinator 141 determines that no occupant is riding in the own-vehicle M and no other vehicle is present near the own-vehicle M is a situation in which there is no vehicle which is affected by sudden acceleration/deceleration of the own-vehicle M. Thus, when the determinator 141 has determined that no occupant is riding in the own-vehicle M and no other vehicle is present near the own-vehicle M, the operation mode determinator 142 determines that the acceleration/deceleration limitation of the own-vehicle M is in the operation mode (5). As a result, the own-vehicle M can suddenly accelerate or decelerate and efficiently change speed and therefore it is possible to shorten the travel time to the destination.

Figure 5:
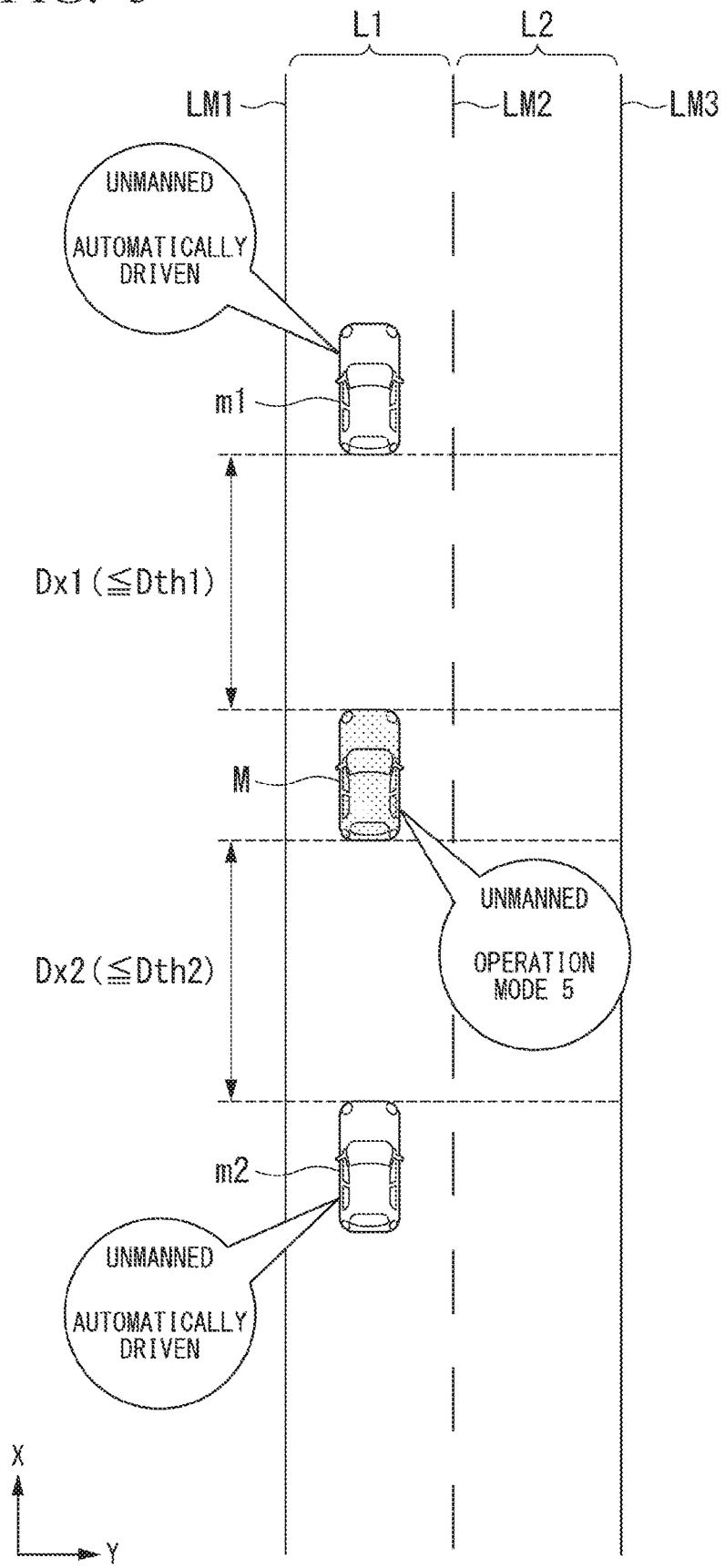
FIG. 5 is a diagram showing another exemplary situation in which it is determined that the acceleration/deceleration limitation of an own-vehicle is in the operation mode (5).

Next, another situation in which it is determined that the acceleration/deceleration limitation of the own-vehicle M is in the operation mode (5) will be described. FIG. 5 is a diagram showing another exemplary situation in which it is determined that the acceleration/deceleration limitation of the own-vehicle M is in the operation mode (5). In the figure, m represents other vehicles. In the example shown in FIG. 5, the determinator 141 determines that no occupant is riding in the own-vehicle M since the own-vehicle M is a vehicle that is being driven by automated driving and is also an unmanned vehicle in which no occupant is riding, similar to the case shown in FIG. 4. In the example shown in FIG. 5, another vehicle m1 is present ahead of the own-vehicle M at a position that is away from the own-vehicle M by a distance Dx1 in the own lane L1. The distance Dx1 is a distance equal to or less than the distance indicated by the threshold value Dth1. For example, the determinator 141 determines that another vehicle m1 is present ahead of the own-vehicle M when the recognition result of the other-vehicle recognizer 132 indicates that the other vehicle m1 is present at a position at or within a distance indicated by the threshold value Dth1 (at a position away by the distance Dx1 in this case) from the position of the own-vehicle M in the moving direction. In the example shown in FIG. 5, another vehicle m2 is present behind the own-vehicle M at a position that is away from the own-vehicle M by a distance Dx2 in the own lane L1. The distance Dx2 is a distance equal to or less than the distance indicated by the threshold value Dth2. For example, the determinator 141 determines that another vehicle m2 is present behind the own-vehicle M when the recognition result of the other-vehicle recognizer 132 indicates that the other vehicle m2 is present at a position at or within a distance indicated by the threshold value Dth2 (at a position away by the distance Dx2 in this case) from the position of the own-vehicle M in the direction opposite to the moving direction. In the example shown in FIG. 5, the other vehicles m1 and m2 are vehicles that are being driven by automated driving and are also unmanned vehicles in which no occupant is riding. The determinator 141 determines that no occupant is riding in the other vehicle m1 and the other vehicle m2, for example, on the basis of the recognition result of the other-vehicle recognizer 132.

The situation in which the determinator 141 determines that no occupant is riding in the own-vehicle M and other vehicles which are being automatically driven and in which no occupant is riding (the other vehicles m1 and m2 in this example) are present near the own-vehicle M is a situation in which there are vehicles capable of coping with sudden acceleration/deceleration of the own-vehicle M and is also a situation in which the vehicles' coping with sudden acceleration/deceleration of the own-vehicle M does not affect occupants of the vehicles. Thus, even when no occupant is riding in the own-vehicle M and other vehicles that are being automatically driven are present near the own-vehicle M, the operation mode determinator 142 determines that the acceleration/deceleration limitation of the own-vehicle M is in the operation mode (5) if it is determined that no occupant is riding in the other vehicles. As a result, the own-vehicle M can suddenly accelerate or decelerate and efficiently change speed and therefore it is possible to shorten the travel time to the destination.

[Situation in which Operation Mode (2) is Determined]

Figure 6:
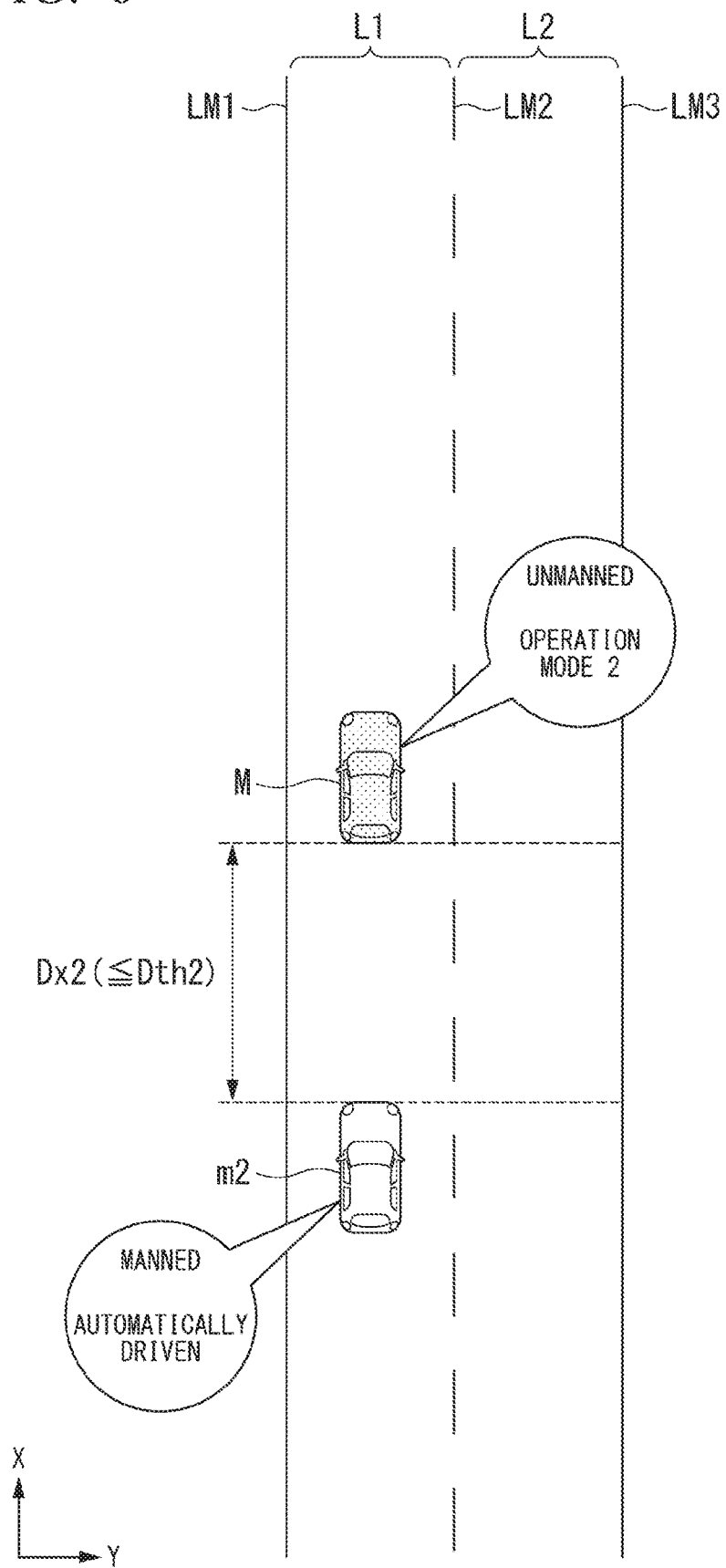
FIG. 6 is a diagram showing an exemplary situation in which it is determined that the acceleration/deceleration limitation of an own-vehicle is in an operation mode (2).

FIG. 6 is a diagram showing an exemplary situation in which it is determined that the acceleration/deceleration limitation of the own-vehicle M is in the operation mode (2). In the example shown in FIG. 6, the determinator 141 determines that no occupant is riding in the own-vehicle M since the own-vehicle M is a vehicle that is being driven by automated driving and is also an unmanned vehicle in which no occupant is riding, similar to the cases shown in FIGS. 4 to 5. In the example shown in FIG. 6, another vehicle m2 is present behind the own-vehicle M at a position that is away from the own-vehicle M by a distance Dx2 in the own lane L1, and thus the determinator 141 determines that another vehicle m2 is present behind the own-vehicle M. In the example shown in FIG. 6, the other vehicle m2 is a vehicle that is being driven by automated driving and is also a manned vehicle in which an occupant is riding. The determinator 141 determines that the other vehicle m2 is being driven by automated driving and an occupant is riding therein, for example, on the basis of the recognition result of the other-vehicle recognizer 132.

The situation in which the determinator 141 determines that no occupant is riding in the own-vehicle M and another vehicle m2 which is being automatically driven and in which an occupant is riding is present behind the own-vehicle M is a situation in which there is a vehicle capable of coping with sudden deceleration of the own-vehicle M and is also a situation in which the vehicle's coping with sudden deceleration of the own-vehicle M affects the occupant of the vehicle (that is, causes a bad ride comfort). Thus, when the determinator 141 has determined that no occupant is riding in the own-vehicle M and another vehicle m2 which is being automatically driven and in which no occupant is riding is present behind the own-vehicle M, the operation mode determinator 142 determines that the acceleration/deceleration limitation of the own-vehicle M is in the operation mode (2). As a result, the own-vehicle M can suddenly accelerate and efficiently change speed and therefore it is possible to shorten the travel time to the destination. The own-vehicle M does not suddenly decelerate and thus can travel with consideration to the other vehicle m2 behind.

[Situation in which Operation Mode (4) is Determined]

Figure 7:
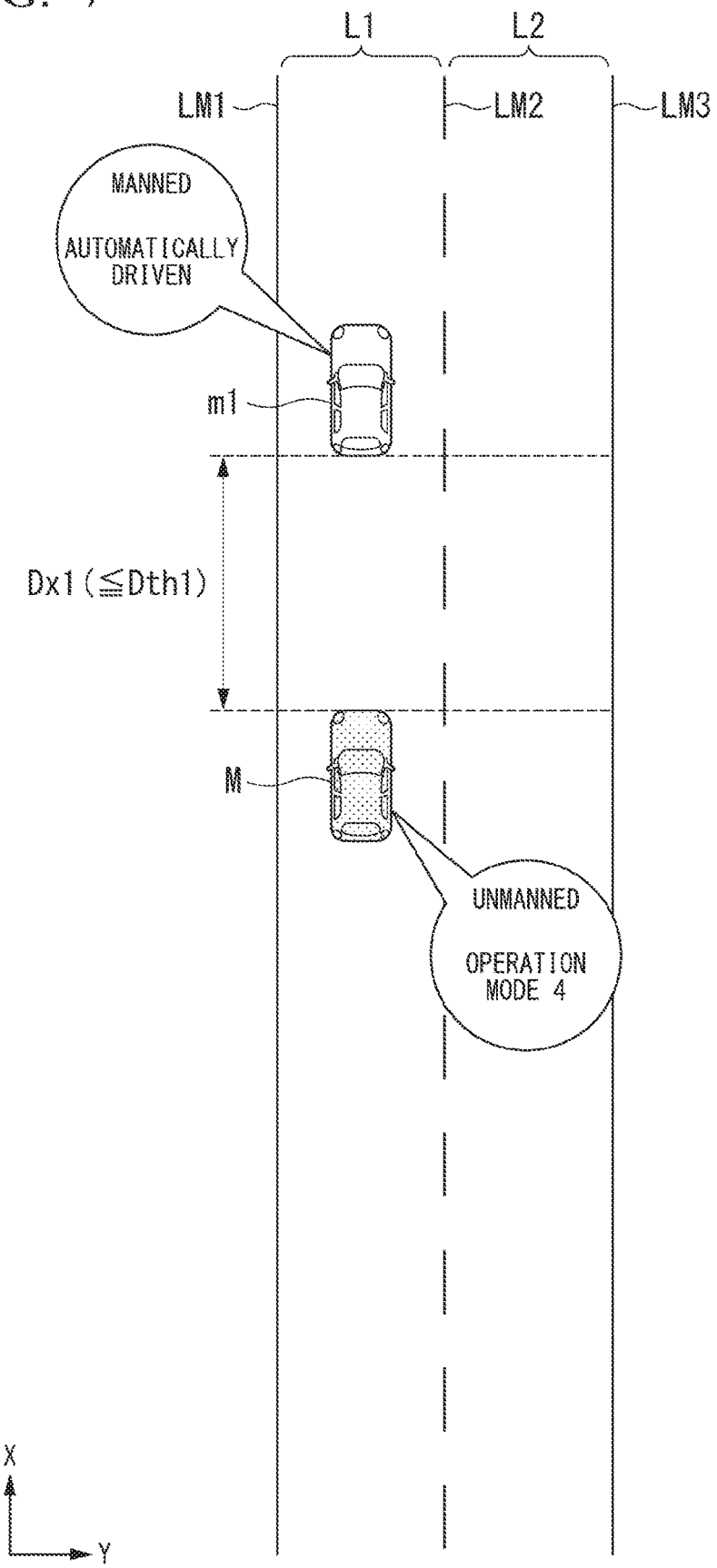
FIG. 7 is a diagram showing an exemplary situation in which it is determined that the acceleration/deceleration limitation of an own-vehicle is in an operation mode (4).

FIG. 7 is a diagram showing an exemplary situation in which it is determined that the acceleration/deceleration limitation of the own-vehicle M is in the operation mode (4). In the figure, m represents another vehicle. In the example shown in FIG. 7, the determinator 141 determines that no occupant is riding in the own-vehicle M since the own-vehicle M is a vehicle that is being driven by automated driving and is also an unmanned vehicle in which no occupant is riding, similar to the cases shown in FIGS. 4 to 6. In the example shown in FIG. 7, another vehicle m1 is present ahead of the own-vehicle M at a position that is away from the own-vehicle M by a distance Dx1 in the own lane L1, and thus the determinator 141 determines that another vehicle m1 is present ahead of the own-vehicle M. In the example shown in FIG. 7, the other vehicle m1 is a vehicle that is being driven by automated driving and is also a manned vehicle in which an occupant is riding. The determinator 141 determines that the other vehicle m1 is being driven by automated driving and an occupant is riding therein, for example, on the basis of the recognition result of the other-vehicle recognizer 132.

The situation in which the determinator 141 determines that no occupant is riding in the own-vehicle M and another vehicle m1 which is being automatically driven and in which an occupant is riding is present ahead of the own-vehicle M is a situation in which there is a vehicle capable of coping with sudden acceleration of the own-vehicle M and is also a situation in which the vehicle's coping with sudden acceleration of the own-vehicle M affects the occupant of the vehicle (that is, causes a bad ride comfort). Thus, when the determinator 141 has determined that no occupant is riding in the own-vehicle M and another vehicle m1 which is being automatically driven and in which an occupant is riding is present ahead of the own-vehicle M, the operation mode determinator 142 determines that the acceleration/deceleration limitation of the own-vehicle M is in the operation mode (4). As a result, the own-vehicle M can suddenly decelerate and efficiently change speed and therefore it is possible to shorten the travel time to the destination. The own-vehicle M does not suddenly accelerate and thus can travel with consideration to the other vehicle m1 ahead.

[Situation in which Operation Mode (3) is Determined]

Figure 8:
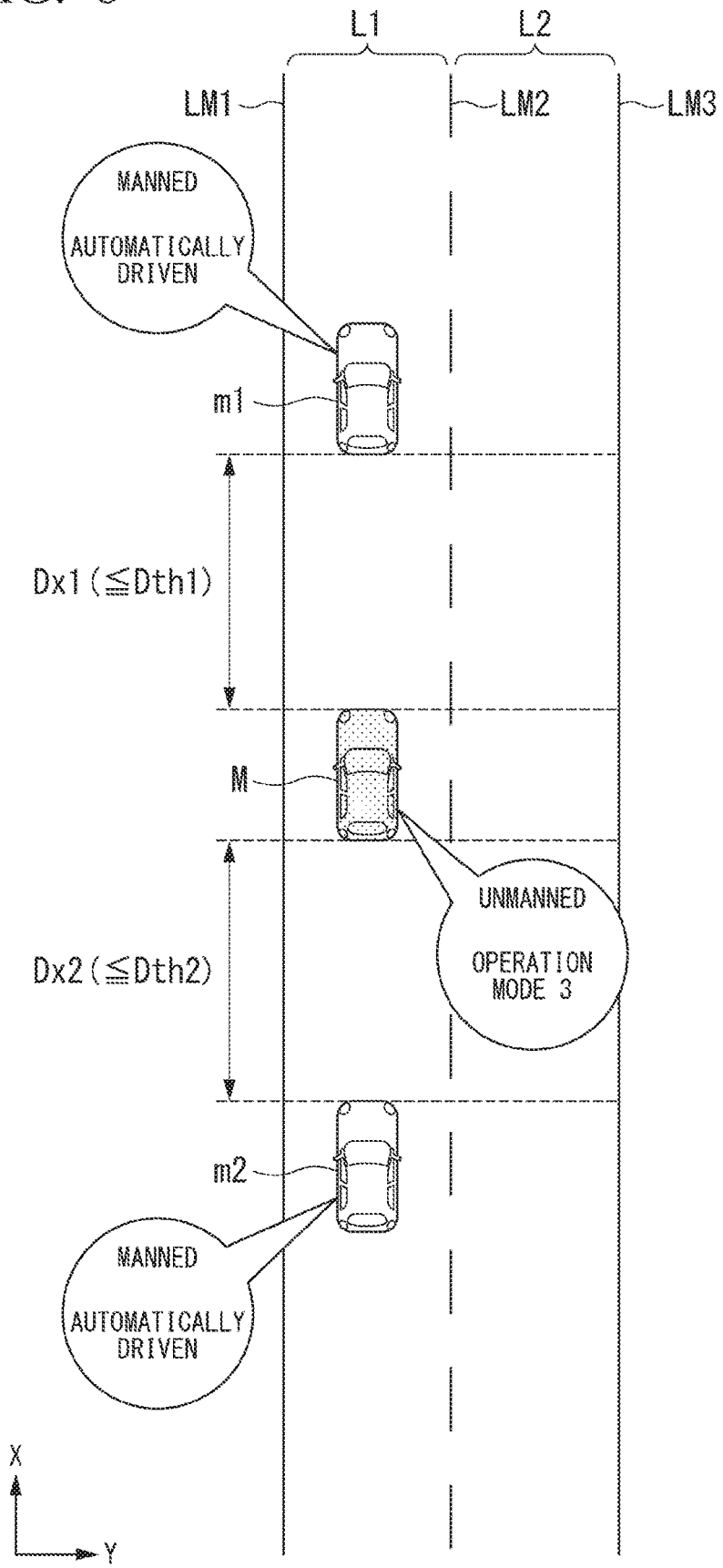
FIG. 8 is a diagram showing an exemplary situation in which it is determined that the acceleration/deceleration limitation of an own-vehicle is in an operation mode (3).

FIG. 8 is a diagram showing an exemplary situation in which it is determined that the acceleration/deceleration limitation of the own-vehicle M is in the operation mode (3). In the example shown in FIG. 8, the determinator 141 determines that no occupant is riding in the own-vehicle M since the own-vehicle M is a vehicle that is being driven by automated driving and is also an unmanned vehicle in which no occupant is riding, similar to the cases shown in FIGS. 4 to 7. In the example shown in FIG. 8, the determinator 141 determines that another vehicle m1 is present ahead of the own-vehicle M and determines that another vehicle m2 is present behind the own-vehicle M, similar to the case shown in FIG. 5. In the example shown in FIG. 8, the other vehicles m1 and m2 are vehicles that are being driven by automated driving and are also manned vehicles in which an occupant is riding. The determinator 141 determines that the other vehicles m1 and m2 are being driven by automated driving and an occupant is riding therein, for example, on the basis of the recognition result of the other-vehicle recognizer 132.

The situation in which the determinator 141 determines that no occupant is riding in the own-vehicle M and other vehicles which are being automatically driven and in which an occupant is riding (the other vehicles m1 and m2 in this example) are present near the own-vehicle M is a situation in which there are vehicles capable of coping with sudden acceleration/deceleration of the own-vehicle M and is also a situation in which the vehicles' coping with sudden acceleration/deceleration of the own-vehicle M affects the occupants of the vehicles (that is, causes a bad ride comfort). Thus, when it is determined that no occupant is riding in the own-vehicle M and other vehicles which are being automatically driven and in which an occupant is riding are present near the own-vehicle M, the operation mode determinator 142 determines that the acceleration/deceleration limitation of the own-vehicle M is in the operation mode (3). As a result, the own-vehicle M can suddenly decelerate/accelerate to some extent and efficiently change speed and therefore it is possible to shorten the travel time to the destination.

[Situation in which Operation Mode (1) is Determined]

Figure 9:
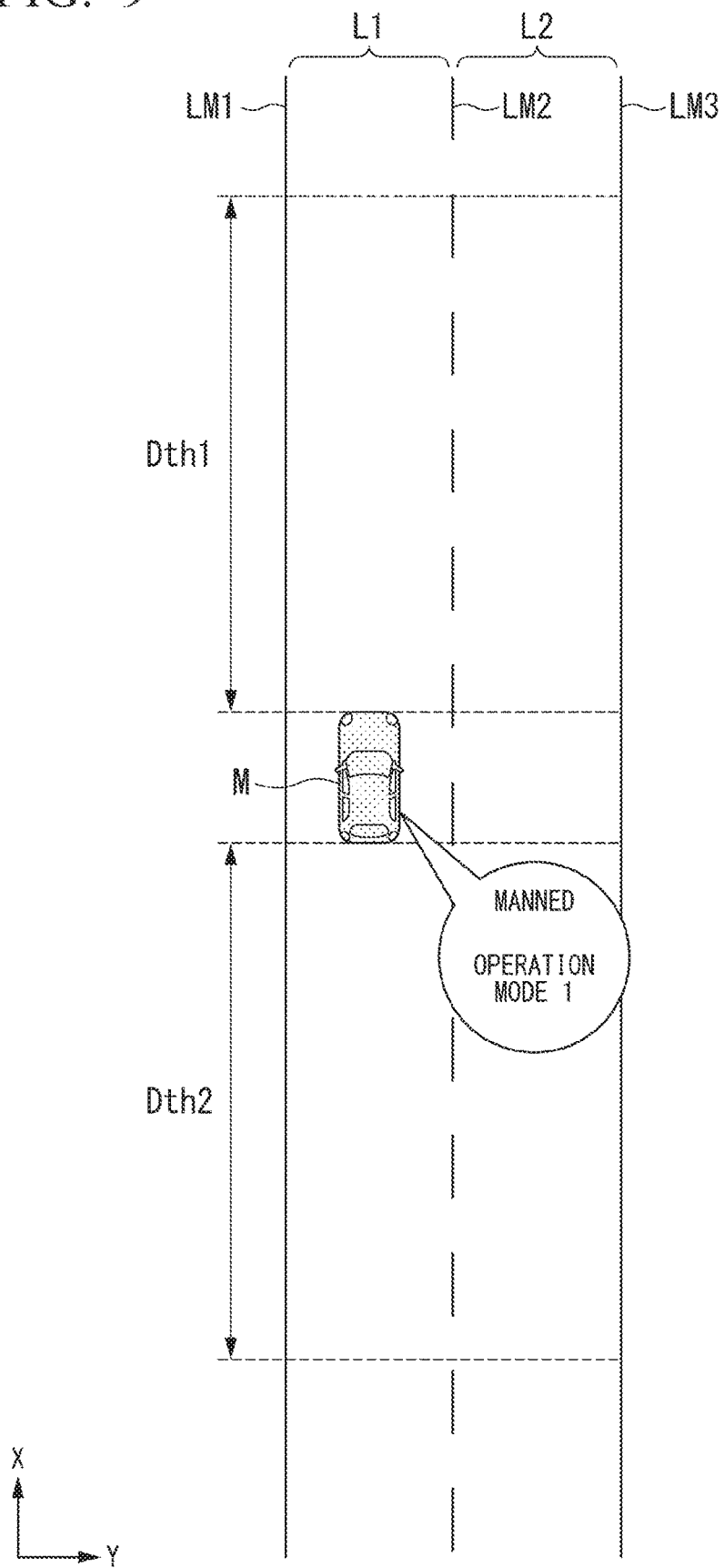
FIG. 9 is a diagram showing an exemplary situation in which it is determined that the acceleration/deceleration limitation of an own-vehicle is in an operation mode (1).

FIG. 9 is a diagram showing an exemplary situation in which it is determined that the acceleration/deceleration limitation of the own-vehicle M is in the operation mode (1). In the example shown in FIG. 9, the own-vehicle M is a vehicle that is being driven by automated driving, but it is a manned vehicle in which an occupant is riding, unlike the cases shown in FIGS. 4 to 8. Thus, the determinator 141 determines that an occupant is riding in the own-vehicle M.

The situation in which the determinator 141 determines that an occupant is riding in the own-vehicle M is a situation in which sudden acceleration/deceleration of the own-vehicle M affects the occupant riding in the own-vehicle M (that is, causes a bad ride comfort). Thus, even if the situation near the own-vehicle M is a situation in which an operation mode such as that of (2) to (5) can be determined (for example, a situation in which no other vehicles are present near the own-vehicle M as shown), the operation mode determinator 142 determines that the acceleration/deceleration limitation of the own-vehicle M is in the operation mode (1) when an occupant is riding in the own-vehicle M. As a result, the own-vehicle M travels to the destination without sudden acceleration/deceleration and thus can travel with consideration to the occupant riding in the own-vehicle M.

Figure 10:
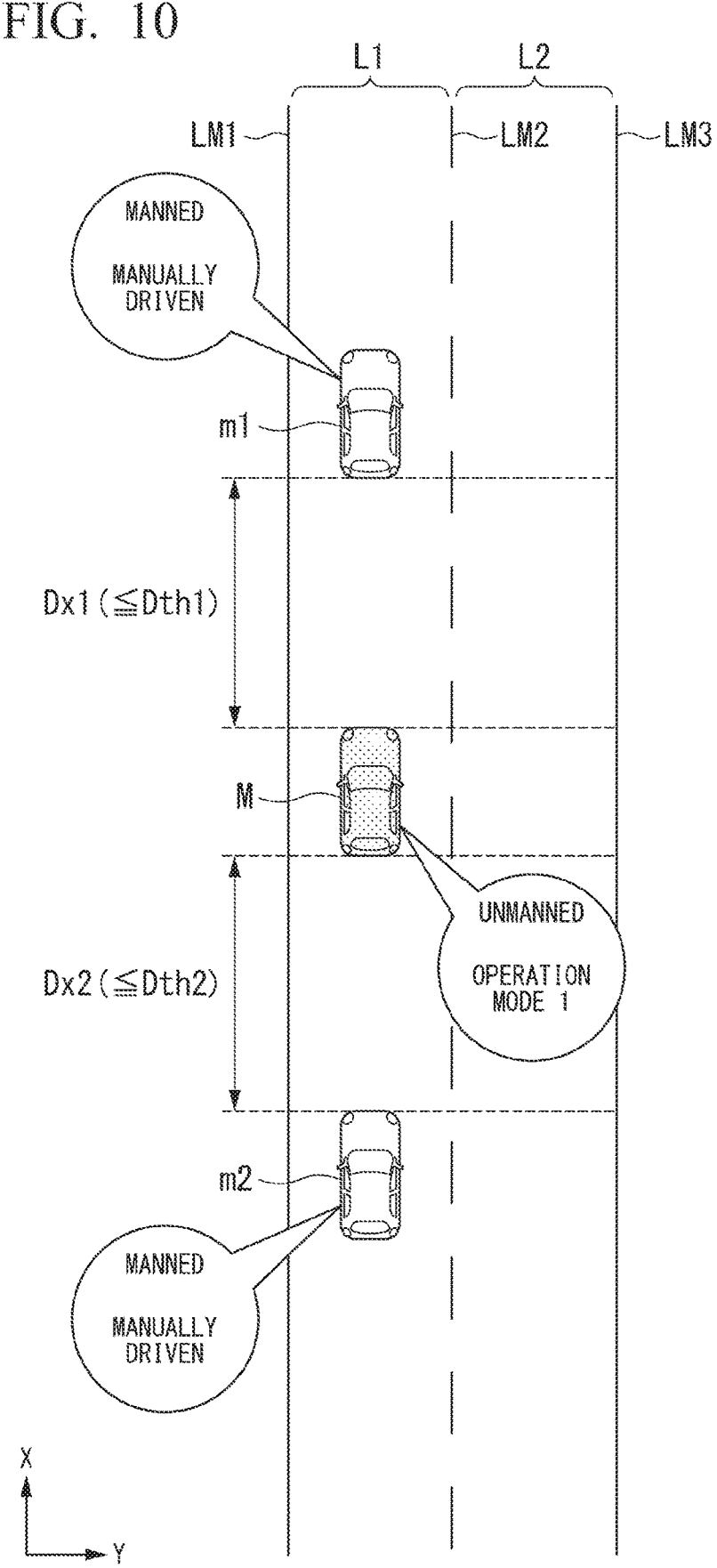
FIG. 10 is a diagram showing another exemplary situation in which it is determined that the acceleration/deceleration limitation of an own-vehicle is in the operation mode (1).

Next, another situation in which it is determined that the acceleration/deceleration limitation of the own-vehicle M is in the operation mode (1) will be described. FIG. 10 is a diagram showing another exemplary situation in which it is determined that the acceleration/deceleration limitation of the own-vehicle M is in the operation mode (1). In the example shown in FIG. 10, the determinator 141 determines that no occupant is riding in the own-vehicle M since the own-vehicle M is a vehicle that is being driven by automated driving and is also an unmanned vehicle in which no occupant is riding, similar to the cases shown in FIGS. 4 to 8. In the example shown in FIG. 10, the determinator 141 determines that another vehicle m1 is present ahead of the own-vehicle M and determines that another vehicle m2 is present behind the own-vehicle M, similar to the case shown in FIG. 8. In the example shown in FIG. 10, the other vehicles m1 and m2 are vehicles that are being driven by manual driving and are also manned vehicles in which an occupant is riding. The determinator 141 determines that the other vehicles m1 and m2 are being driven by manual driving and an occupant is riding therein, for example, on the basis of the recognition result of the other-vehicle recognizer 132.

The situation in which the determinator 141 determines that other vehicles present near the own-vehicle M (the other vehicles m1 and m2 in this example) are being driven by manual driving is a situation in which it is difficult for the own-vehicle M to suddenly accelerate or decelerate since it is difficult to presume the movement of the other vehicles. Thus, when other vehicles present near the own-vehicle M are being driven by manual driving, the operation mode determinator 142 determines that the acceleration/deceleration limitation of the own-vehicle M is in the operation mode (1). As a result, the own-vehicle M travels without sudden acceleration/deceleration to the destination and thus it is possible to limit contact between the own-vehicle M and the other vehicles.

[About Travel Plan]

Here, when the operation mode determinator 142 has determined that the acceleration/deceleration limitation of the own-vehicle M is in the operation modes (2) to (5) in which the acceleration/deceleration limitation is more relaxed than in the operation mode (1), the own-vehicle M can further shorten the travel time by maintaining the determined operation modes (2) to (5) as described above. Therefore, the automated driving control device 100 generates a travel plan with which traveling is possible while maintaining the operation modes (2) to (5). Specifically, the route determinator 53 and the recommended lane determinator 61 determine an on-map route and a recommended lane where traffic of other vehicles is small on the basis of the first map information 54, the second map information 62, the road information, the traffic regulation information, the address information (addresses/postal codes), or the like. The route determinator 53 and the recommended lane determinator 61 determine an on-map route and a recommended lane with a low right or left turn frequency on the basis of the first map information 54, the second map information 62, the road information, the traffic regulation information, the address information (addresses/postal codes), or the like. The recommended lane determinator 61 is an example of the "travel plan generator."

[About Position where Another Vehicle is Present]

The above description has been given with reference to the case in which the other vehicle recognized by the other-vehicle recognizer 132 is one which is present in the own lane L1, but the present invention is not limited to this. The other vehicle recognized by the other-vehicle recognizer 132 may also be one which is present in the adjacent lane L2. Thus, the other-vehicle recognizer 132 can recognize a vehicle that is likely to travel the own lane L1 by changing lanes (that is, another vehicle present in the adjacent lane L2) and the automated driving control device 100 can control traveling with consideration to the other vehicle.

[Process Flow]

Figure 11:
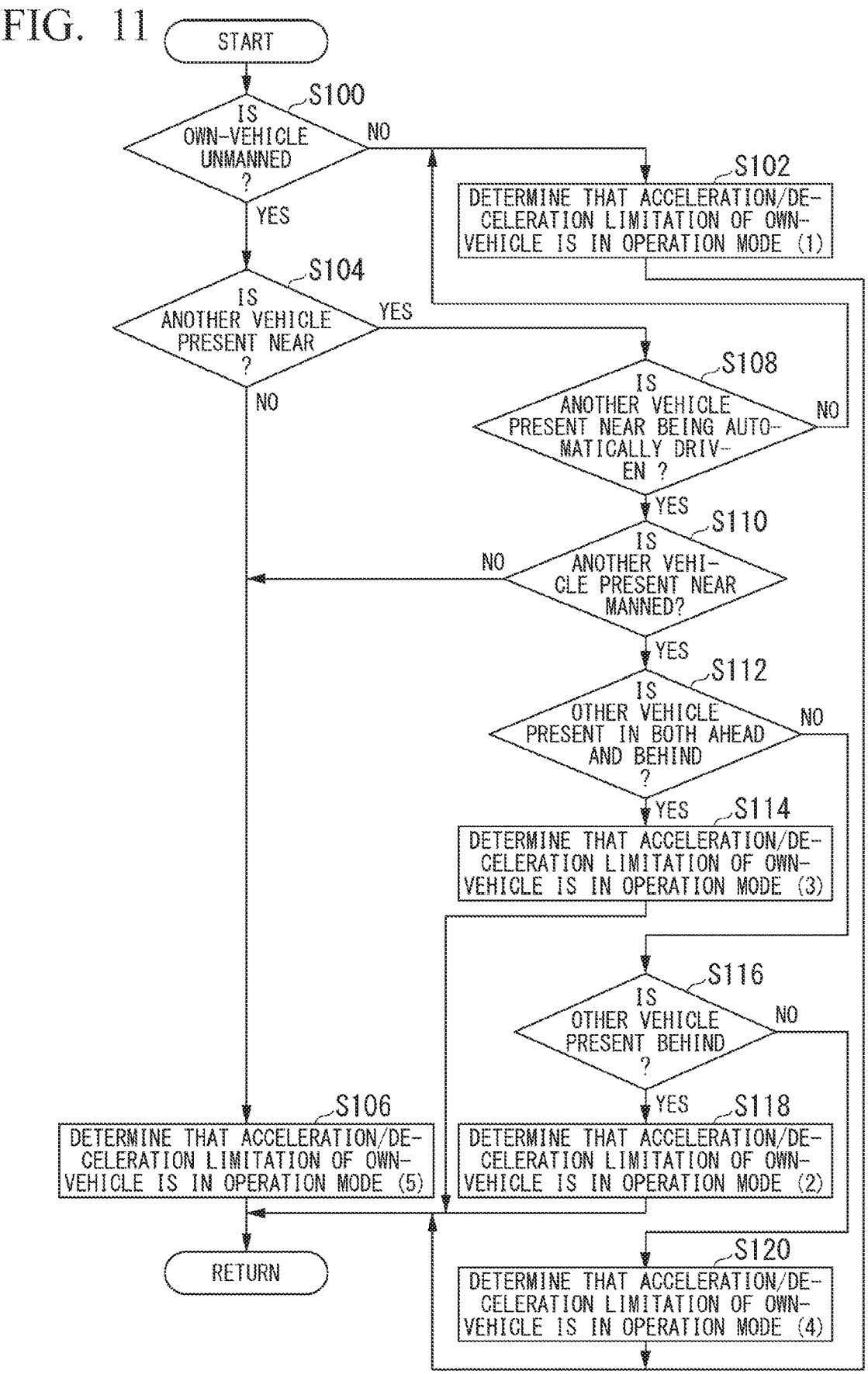
FIG. 11 is a flowchart showing an example of a flow of a series of processes of an automated driving control device according to an embodiment.

Hereinafter, a flow of a series of processes of the automated driving control device 100 according to an embodiment will be described with reference to a flowchart. FIG. 11 is a flowchart showing an example of a flow of a series of processes of the automated driving control device 100 according to an embodiment. The process of this flowchart is repeatedly performed, for example, at a predetermined cycle.

First, the determinator 141 determines whether or not an occupant is riding in the own-vehicle M on the basis of the recognition result of the occupant recognizer 131 (step S100). When the determination result of the determinator 141 indicates that an occupant is riding in the own-vehicle M (that is, it is manned), the operation mode determinator 142 determines that the acceleration/deceleration limitation of the own-vehicle M is in the operation mode (1) (step S102). Next, when no occupant is riding in the own-vehicle M (that is, it is unmanned), the determinator 141 further determines whether or not another vehicle is present near the own-vehicle M (step S104). When no other vehicle is present near the own-vehicle M, the operation mode determinator 142 determines that the acceleration/deceleration limitation of the own-vehicle M is in the operation mode (5) (step S106). Next, when the determination result of the determinator 141 indicates that another vehicle is present near the own-vehicle M, the determinator 141 further determines whether or not the other vehicle is a vehicle that is being automatically driven (step S108).

When the other vehicle present near the own-vehicle M is not a vehicle that is being automatically driven) (that is, when it is a vehicle that is being manually driven), the operation mode determinator 142 determines that the acceleration/deceleration limitation of the own-vehicle M is in the operation mode (1) (step S102). Next, when the other vehicle present near the own-vehicle M is a vehicle that is being automatically driven, the determinator 141 further determines whether or not an occupant is riding in the other vehicle (step S110). When no occupant is riding in the other vehicle that is present near the own-vehicle M and is being automatically driven (that is, it is unmanned), the operation mode determinator 142 determines that the acceleration/deceleration limitation of the own-vehicle M is in the operation mode (5) (step S106). Next, when an occupant is riding in the other vehicle that is present near the own-vehicle M and is being automatically driven, the determinator 141 further determines whether or not the other vehicle is present both in front of and behind the own-vehicle M (step S112). When an occupant is riding in the other vehicle that is present near the own-vehicle M and is being automatically driven and the other vehicle is present both in front of and behind the own-vehicle M, the operation mode determinator 142 determines that the acceleration/deceleration limitation of the own-vehicle M is in the operation mode (3) (step S114).

Next, when an occupant is riding in the other vehicle that is present near the own-vehicle M and is being automatically driven and the other vehicle is present not both in front of and behind the own-vehicle M, the determinator 141 further determines whether the other vehicle is present ahead of or behind the own-vehicle M (step S116). When an occupant is riding in the other vehicle that is present near the own-vehicle M and is being automatically driven and the other vehicle is present behind the own-vehicle M, the operation mode determinator 142 determines that the acceleration/deceleration limitation of the own-vehicle M is in the operation mode (2) (step S118). When an occupant is riding in the other vehicle that is present near the own-vehicle M and is being automatically driven and the other vehicle is present ahead of the own-vehicle M, the operation mode determinator 142 determines the acceleration/deceleration limitation of the own-vehicle M is in the operation mode (4) (step S120).

Summary of Embodiments

As described above, the automated driving control device 100 according to the present embodiment includes the recognizer 130 configured to recognize a situation near the own-vehicle M, and the driving controller (the behavior plan generator 140 and the second controller 160 in this example) configured to control one or both of steering or acceleration/deceleration of the own-vehicle M on the basis of a recognition result of the recognizer 130, wherein the driving controller is configured to determine an operation mode of control of the acceleration/deceleration on the basis of a state of another vehicle present near the own-vehicle M, such that the own-vehicle can suddenly accelerate or decelerate according to the presence or absence of an occupant in the vehicle and thus it is possible to shorten the travel time.

[About Determination of Operation Mode Based on Distance to Other Vehicle]

The above description has been given with reference to the case in which the operation mode determinator 142 determines that the acceleration/deceleration limitation of the own-vehicle M is in one of the operation modes (2) to (5) when no occupant is riding in the own-vehicle M and another vehicle in which an occupant is riding and which is being automatically driven is present near the own-vehicle M, but the present invention is not limited to this. For example, the operation mode determinator 142 may change the upper limit of acceleration/deceleration stepwise or linearly according to the distance between another vehicle present near the own-vehicle M and the own-vehicle M. For example, the operation mode determinator 142 makes the upper limit value of acceleration/deceleration (that is, the upper limit of acceleration) stricter when the distance Dx1 is short, the upper limit value of acceleration/deceleration more relaxed when the distance Dx1 is long, the lower limit value of acceleration/deceleration (that is, the lower limit of acceleration) stricter when the distance Dx2 is short, and the lower limit value of acceleration/deceleration more relaxed when the distance Dx2 is long.

[About Recognition Range of Recognizer 130]

Figure 12:
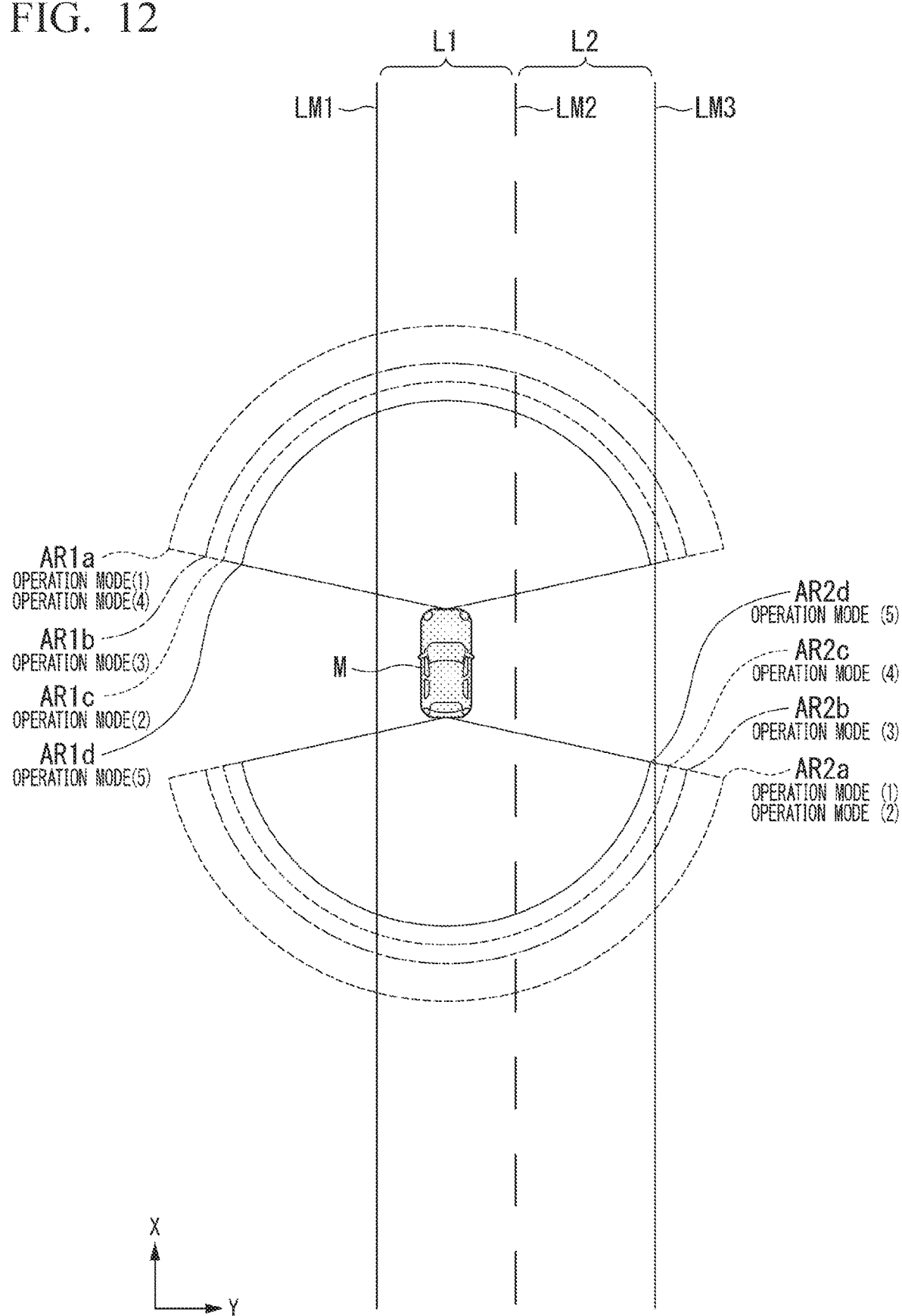
FIG. 12 is a diagram showing exemplary recognition ranges of a recognizer.

The recognition range of the recognizer 130 according to the operation mode will now be described. FIG. 12 is a diagram showing an example of the recognition range of the recognizer 130. In the case of the operation mode (1), it may take time for the own-vehicle M to stop since the acceleration/deceleration limitation is strict. On the other hand, in the case of the operation modes (2) to (5), it is possible to shorten the time required for the own-vehicle M to stop compared to the case of the operation mode (1) since the acceleration/deceleration limitation is more relaxed than in the operation mode (1). Thus, in the case of the operation modes (2) to (5), the own-vehicle M can stop in a short time although sudden jumping or the like occurs in the moving direction of the own-vehicle M. Therefore, when the acceleration/deceleration limitation of the own-vehicle M is in the operation modes (2) to (5), the recognizer 130 may narrow the recognition range in which the situation near the own-vehicle M is recognized than the recognition range in the operation mode (1). For example, the recognizer 130 may narrow the recognition range by narrowing an imaging range in which the camera 10 images, a radiation range in which the radar device 12 radiates radio waves, or an irradiation range in which the finder 14 illuminates light, may narrow the recognition range by making a recognition-related threshold value high (that is, by making recognition difficult), or may narrow the recognition range by using a result of a partial range (that is, a narrowed range) among results of acquired recognition ranges.

For example, the recognizer 130 changes the recognition range in front of the own-vehicle M (hereinafter referred to as a front recognition range AR1) among four types of ranges (front recognition ranges AR1*a* to AR1*d* shown in the figure) according to the operation mode and changes the recognition range behind the own-vehicle M (hereinafter referred to as a rear recognition range AR2) among four types of ranges (rear recognition ranges AR2*a* to AR2*d* shown in the figure) according to the operation mode. As shown, the front recognition range AR1*d* and the rear recognition range AR2*d* are the narrowest recognition ranges, the front recognition range AR1*c* and the rear recognition range AR2*c* are the next narrow recognition ranges, the front recognition range AR1*b* and the rear recognition range AR2*b* are the next narrow recognition ranges, and the front recognition range AR1*a* and the rear recognition range AR2*a* are the widest recognition ranges.

When the acceleration/deceleration limitation of the own-vehicle M is in the operation mode (1), the recognizer 130 sets the front recognition range AR1 to the front recognition range AR1*a* and the rear recognition range AR2 to the rear recognition range AR2*a*. When the acceleration/deceleration limitation of the own-vehicle M is in the operation mode (2), the recognizer 130 sets the front recognition range AR1*c* to the front recognition range AR1*c* and the rear recognition range AR2 to the rear recognition range AR2*a*. When the acceleration/deceleration limitation of the own-vehicle M is in the operation mode (3), the recognizer 130 sets the front recognition range AR1 to the front recognition range AR1*b* and the rear recognition range AR2 to the rear recognition range AR2*b*. When the acceleration/deceleration limitation of the own-vehicle M is in the operation mode (4), the recognizer 130 sets the front recognition range AR1 to the front recognition range AR1*a* and the rear recognition range AR2 to the rear recognition range AR2*c*. When the acceleration/deceleration limitation of the own-vehicle M is in the operation mode (5), the recognizer 130 sets the front recognition range AR1 to the front recognition range AR1*d* and the rear recognition range AR2 to the rear recognition range AR2*d*.

Thus, the automated driving control device 100 can limit electric power related to the process of recognizing the situation near the own-vehicle M by narrowing the recognition range of the recognizer 130 according to the operation mode. When the own-vehicle M is driven by an electric motor, it is possible to extend the travel distance by limiting electric power relating to the process of recognizing the situation near the own-vehicle M.

[Hardware Configuration]

Figure 13:
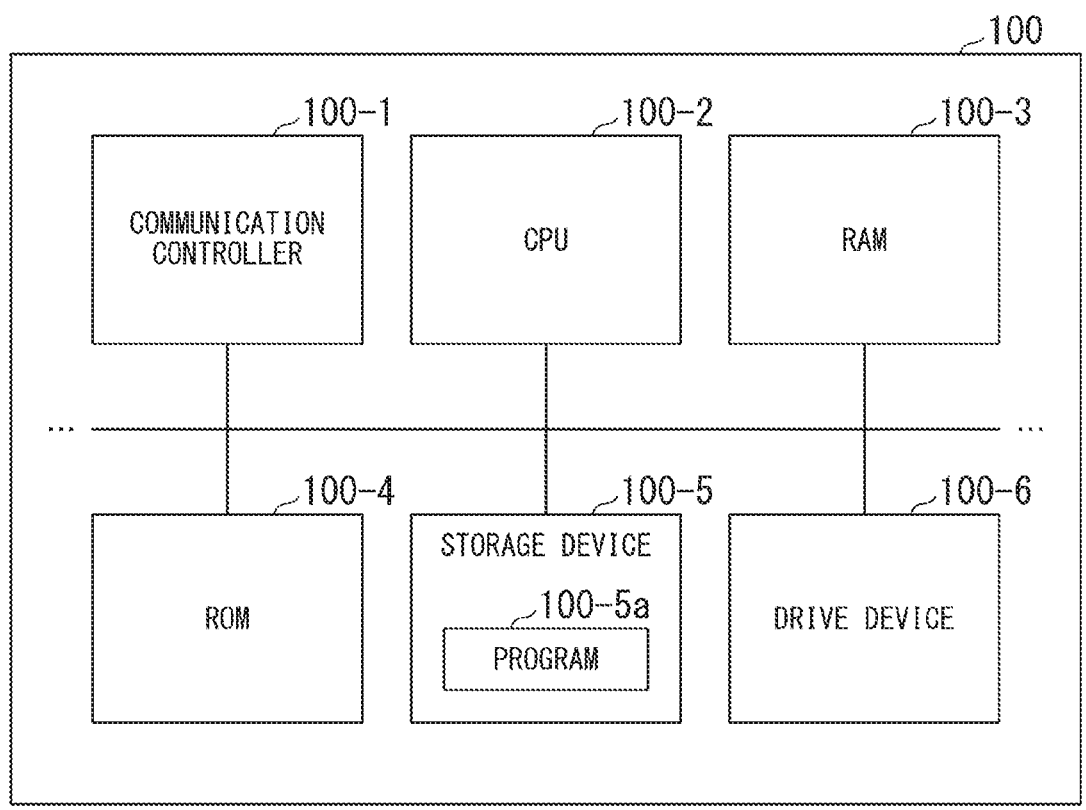
FIG. 13 is a diagram showing an example of the hardware configuration of an automated driving control device according to an embodiment.

FIG. 13 is a diagram showing an example of the hardware configuration of the automated driving control device 100 according to the embodiment. As shown, the automated driving control device 100 is configured such that a communication controller 100-1, a CPU 100-2, a RAM 100-3 used as a working memory, a ROM 100-4 storing a boot program or the like, a storage device 100-5 such as a flash memory or an HDD, a drive device 100-6, or the like are connected to each other via an internal bus or a dedicated communication line. The communication controller 100-1 performs communication with components other than the automated driving control device 100. The storage device 100-5 stores a program 100-5*a* to be executed by the CPU 100-2. This program is loaded in the RAM 100-3 by a direct memory access (DMA) controller (not shown) or the like and then executed by the CPU 100-2. Thereby, some or all of the first controller 120 and the second controller 160 are realized.

The embodiments described above can be expressed as follows.

A vehicle control device includes:
a storage configured to store a program; and
a processor,
wherein the processor is configured to execute the program to:
recognize a situation near an own-vehicle;
control one or both of steering or acceleration/deceleration of the own-vehicle on the basis of a result of the recognition; and
determine an operation mode of control of the acceleration/deceleration on the basis of a state of another vehicle present near the own-vehicle.

Although the modes for carrying out the present invention have been described above by way of embodiments, the present invention is not limited to these embodiments at all and various modifications and substitutions may be made without departing from the spirit of the present invention.

What is claimed is:

1. A vehicle control device comprising:
a recognizer configured to recognize a situation near an own-vehicle; and
a driving controller configured to control one or both of steering or acceleration/deceleration of the own-vehicle on the basis of a recognition result of the recognizer,
wherein the driving controller is configured to not perform determination of an operation mode of control of the acceleration/deceleration when the recognizer has recognized that an occupant is riding in the own-vehicle and to determine the operation mode of control of the acceleration/deceleration on the basis of a state of another vehicle present near the own-vehicle recognized by the recognizer when the recognizer has recognized that no occupant is riding in the own-vehicle, and
wherein the driving controller is configured to set the operation mode to an operation mode in which limitation of the acceleration/deceleration is the most relaxed when the recognizer has recognized that no other vehicle is present near the own-vehicle.

2. The vehicle control device according to claim 1, wherein the driving controller is configured to set the operation mode to an operation mode in which limitation of the acceleration/deceleration is relaxed when the recognizer has recognized that the other vehicle is an automatically driven vehicle, compared to when the recognizer has recognized that the other vehicle is not an automatically driven vehicle.

3. The vehicle control device according to claim 1, wherein the driving controller is configured to, if the recognizer recognizes that the other vehicle is an automatically driven vehicle, determine the operation mode on the basis of whether or not the recognizer has recognized that an occupant is riding in the other vehicle.

4. The vehicle control device according to claim 3, wherein the driving controller is configured to, if the recognizer recognizes that the other vehicle is an automatically driven vehicle, set the operation mode to an operation mode in which limitation of the acceleration/deceleration is relaxed when the recognizer has recognized that no occupant is riding in the other vehicle, compared to when the recognizer has recognized that an occupant is riding in the other vehicle.

5. The vehicle control device according to claim 1, further comprising a travel plan generator configured to generate a travel plan for preferentially traveling on a route in which traveling is possible in an operation mode in which limitation of the acceleration/deceleration is relaxed,
wherein the driving controller is configured to control the own-vehicle on the basis of the travel plan generated by the travel plan generator.

6. The vehicle control device according to claim 5, wherein the travel plan generator is configured to preferentially select a route with less traffic than other routes in which travelling is possible.

7. The vehicle control device according to claim 5, wherein the travel plan generator is configured to preferentially select a route with a lower right or left turn frequency than other routes in which travelling is possible.

8. The vehicle control device according to claim 1, wherein the recognizer is configured to limit recognition processing when the driving controller performs control in an operation mode in which limitation of the acceleration/deceleration is relaxed, compared to when the driving controller does not perform control in the operation mode in which limitation of the acceleration/deceleration is relaxed.

9. A vehicle control device comprising:
a recognizer configured to recognize a situation near an own-vehicle; and
a driving controller configured to control one or both of steering or acceleration/deceleration of the own-vehicle on the basis of a recognition result of the recognizer,
wherein the recognizer is configured to limit recognition processing when the driving controller controls the acceleration/deceleration in an operation mode in which limitation of the acceleration/deceleration is relaxed compared to when the driving controller does not control the acceleration/deceleration in the operation mode in which limitation of the acceleration/deceleration is relaxed.

10. A vehicle control method comprising:
a vehicle control device recognizing a situation near an own-vehicle; and
controlling one or both of steering or acceleration/deceleration of the own-vehicle on the basis of a result of the recognition,
wherein determination of an operation mode of control of the acceleration/deceleration is not performed when it has been recognized that an occupant is riding in the own-vehicle and the operation mode of control of the acceleration/deceleration is determined on the basis of a recognized state of another vehicle present near the own-vehicle when it has been recognized that no occupant is riding in the own-vehicle, and
wherein the operation mode is set to an operation mode in which limitation of the acceleration/deceleration is the most relaxed when it has been recognized that no other vehicle is present near the own-vehicle.

11. A computer readable non-transitory storage medium causing a vehicle control device to:
recognize a situation near an own-vehicle; and
control one or both of steering or acceleration/deceleration of the own-vehicle on the basis of a result of the recognition;
wherein determination of an operation mode of control of the acceleration/deceleration is not performed when it has been recognized that an occupant is riding in the own-vehicle and the operation mode of control of the acceleration/deceleration is determined on the basis of a recognized state of another vehicle present near the own-vehicle when it has been recognized that no occupant is riding in the own-vehicle, and wherein the operation mode is set to an operation mode in which limitation of the acceleration/deceleration is the most relaxed when it has been recognized that no other vehicle is present near the own-vehicle.

12. A vehicle control device comprising:
a recognizer configured to recognize a situation near an own-vehicle; and
a driving controller configured to control one or both of steering or acceleration/deceleration of the own-vehicle on the basis of a recognition result of the recognizer,
wherein the driving controller is further configured to not perform determination of an operation mode of control of the acceleration/deceleration when the recognizer has recognized that an occupant is riding in the own-vehicle and to determine the operation mode of control of the acceleration/deceleration on the basis of a state of another vehicle present near the own-vehicle recognized by the recognizer when the recognizer has recognized that no occupant is riding in the own-vehicle, and
wherein the recognizer is further configured to limit recognition processing when the driving controller performs control in an operation mode in which limitation of the acceleration/deceleration is relaxed, compared to when the driving controller does not perform control in the operation mode in which limitation of the acceleration/deceleration is relaxed.

13. A vehicle control method comprising:
a vehicle control device recognizing a situation near an own-vehicle; and
controlling one or both of steering or acceleration/deceleration of the own-vehicle on the basis of a result of the recognition,
wherein determination of an operation mode of control of the acceleration/deceleration is not performed when it has been recognized that an occupant is riding in the own-vehicle and the operation mode of control of the acceleration/deceleration is determined on the basis of a recognized state of another vehicle present near the own-vehicle when it has been recognized that no occupant is riding in the own-vehicle, and
wherein the vehicle control device is configured to limit recognition processing when the vehicle control device performs control in an operation mode in which limitation of the acceleration/deceleration is relaxed, compared to when the vehicle control device does not perform control in the operation mode in which limitation of the acceleration/deceleration is relaxed.

14. A vehicle control method comprising:
a vehicle control device recognizing a situation near an own-vehicle; and
controlling one or both of steering or acceleration/deceleration of the own-vehicle on the basis of a result of the recognition,
wherein determination of an operation mode of control of the acceleration/deceleration is not performed when it has been recognized that an occupant is riding in the own-vehicle and the operation mode of control of the acceleration/deceleration is determined on the basis of a recognized state of another vehicle present near the own-vehicle when it has been recognized that no occupant is riding in the own-vehicle, and
wherein the vehicle control device is configured to limit recognition processing when the vehicle control device controls the acceleration/deceleration in an operation mode in which limitation of the acceleration/deceleration is relaxed compared to when the vehicle control device does not control the acceleration/deceleration in the operation mode in which limitation of the acceleration/deceleration is relaxed.

15. A computer readable non-transitory storage medium causing a vehicle control device to:
recognize a situation near an own-vehicle; and
control one or both of steering or acceleration/deceleration of the own-vehicle on the basis of a result of the recognition;
wherein determination of an operation mode of control of the acceleration/deceleration is not performed when it has been recognized that an occupant is riding in the own-vehicle and the operation mode of control of the acceleration/deceleration is determined on the basis of a recognized state of another vehicle present near the own-vehicle when it has been recognized that no occupant is riding in the own-vehicle, and
the vehicle control device is configured to limit recognition processing when the vehicle control device performs control in an operation mode in which limitation of the acceleration/deceleration is relaxed, compared to when the vehicle control device does not perform control in the operation mode in which limitation of the acceleration/deceleration is relaxed.

16. A computer readable non-transitory storage medium causing a vehicle control device to:
recognize a situation near an own-vehicle; and
control one or both of steering or acceleration/deceleration of the own-vehicle on the basis of a result of the recognition;
wherein determination of an operation mode of control of the acceleration/deceleration is not performed when it has been recognized that an occupant is riding in the own-vehicle and the operation mode of control of the acceleration/deceleration is determined on the basis of a recognized state of another vehicle present near the own-vehicle when it has been recognized that no occupant is riding in the own-vehicle, and
the vehicle control device is configured to limit recognition processing when the vehicle control device controls the acceleration/deceleration in an operation mode in which limitation of the acceleration/deceleration is relaxed compared to when the vehicle control device does not control the acceleration/deceleration in the operation mode in which limitation of the acceleration/deceleration is relaxed.

* * * * *